United States Patent Office 3,781,286
Patented Dec. 25, 1973

3,781,286
PROCESS FOR THE PREPARATION OF AMIDES OF NITROGEN HETEROCYCLIC COMPOUNDS
Francesco Minisci, Milan, Remo Galli, Torricella del Pizzo, and Adolfo Quilico, Milan, Italy, assignors to Montecatini Edison S.p.A., Milan, Italy
No Drawing. Filed Nov. 17, 1970, Ser. No. 90,445
Claims priority, application Italy, Nov. 21, 1969, 24,704/69
Int. Cl. C07d 51/76, 51/78
U.S. Cl. 260—250 R   5 Claims

ABSTRACT OF THE DISCLOSURE

A process is disclosed for the preparation of amides of nitrogen aromatic heterocyclic bases wherein a heteroaromatic base, preferably in salt form is reacted with a formamide, $HCONR_2$, wherein R is hydrogen or an alkyl group having from 1 to 5 carbon atoms, preferably $CH_3$, and with a radical R'O· wherein R' is hydrogen, an alkyl or a cycloalkyl group. The source for the R'O· radicals is a redox system consisting essentially of $R'OOH+Fe^{++}$, wherein R' is hydrogen, an alkyl or a cycloalkyl group, at temperatures between —10° and 60° C., and preferably at temperatures between —5° and +35° C.

The present invention relates to a new process for the direct introduction of an amidic group into a nitrogen aromatic heterocyclic ring.

The process may be represented by the folowing reaction:

$$Ar\text{—}H + HCONR_2 \rightarrow Ar\text{—}CONR_2$$

wherein Ar—H is a nitrogen aromatic heterocyclic base and R is hydrogen or an alkyl group having from 1 to 5 carbon atoms. The process is based on the reaction of the heterocyclic base with a formamide in the presence of R'O· radicals, wherein R' is hydrogen, an alkyl or cycloalkyl group.

Radicals R'O· (hydroxy, alkoxy, cycloalkyoxy) are supplied by a redox system consisting of hydrogen peroxide and a ferrous salt, or an organic hydroperoxide and a ferrous salt. The redox system may be represented by the formula: $R'OOH+Fe^{++}$, wherein R' is hydrogen, alkyl or a cycloalkyl group. The hydroperoxide has the function of removing the H from the formamide $HCONR_2$. For this purpose hydroperoxides are preferred having from 4 to 6 carbon atoms.

In order to obtain the alkoxy or cycloalkoxy radicals, it is possible to use dialkyl-peroxides having the formula R'—O—O—R' which decompose by heating. For instance, in the case of di-t-butyl-peroxide (tBu-O-O-tBu) it is sufficient to heat under reflux conditions the mixture (base+formamide+peroxide) the boiling temperature of which varies between 110° and 140° C., depending on the ratio between the formamide and peroxide.

The heterocyclic base contains at least one N atom in the ring (of 5 or 6 carbon atoms) which shows an aromatic character. The nitrogen base is preferably used in the form of a salt, with a strong mineral acid; this latter has the function chiefly of protonizing the nitrogen. As a heterocyclic base is used, for instance: quinoxaline, pyrazine, quinoline, pyridine, benzothiazole or benzoimidazole, which may be substituted.

As an $HCONR_2$ compound, formamide and dimethylformamide are preferably used. These compounds may be used not only as reactants but also as solvents; the excess is recovered at the end of the reaction by simple distillation.

Therefore, although for each molecule of base there could be used 1 mol of formamide, there are preferably used more than 10 mols of the latter. Moreover, as a solvent for the heterocyclic base water may be used since this latter can partially replace the amide as a solvent.

The motor ratio between the ferrous salt and hydrogen peroxide or hydroperoxide is preferably between 0.5 and 1, while the molar ratio between the hydroperoxide and the heteroaromatic base may vary between 1 and 10.

The reaction is conducted at atmospheric pressure and at temperatures between —10° and +60° C., and preferably at temperatures between —5° and +35° C.

By using a peroxide it will be necessary to operate at higher temperatures (preferably at the reflux temperature of the mixture in order to decompose the peroxide).

The process according to the present invention is particularly simple and consists in adding, with stirring, hydrogen peroxide or hydroperoxide to a mixture of a ferrous salt and the heteroaromatic base, preferably in the form of its salt in formamide, and in the presence or absence of water.

A variant of this process is one wherein the peroxide and the heteroaromatic base are mixed together in formamide whereupon a finely powdered ferrous salt is added in small portions at a time.

A still further variant consists in gradually and separately but simultaneously adding the peroxide and the metal salt to the solution of the heteroaromatic base in formamide.

The addition of the reactants is carried out gradually over a period of from 5 to 60 minutes, so as to maintain the temperature within the predetermined values.

The process according to this invention has a very general character, as may be observed from the great variety of heteroaromatic bases given below as examples.

The positions of attack are those ensuring the maximum nucleophile reactivity, that is, positions 2 and 4 with respect to the heterocyclic nitrogen, and they must be regarded as being in relation to the nucleophile character of the ·$CONR_2$ radicals that are obtained from the corresponding formamides by the splitting off of hydrogen through the action of the R'O· radical (hydroxy, alkoxy or cycloalkoxy):

$$R'O· + HCONR_2 \rightarrow R'OH + ·CONR_2$$

The reaction may lead to monoamides as well as to polyamides, depending on the ratio between the reactants and on the structure of the heteroaromatic base.

Among the compounds that may be obtained by the present process are for instance:

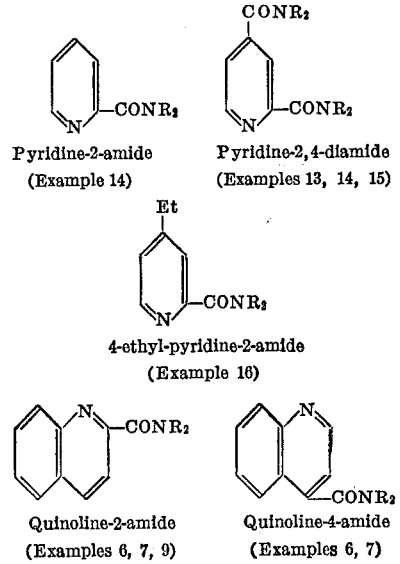

Pyridine-2-amide
(Example 14)

Pyridine-2,4-diamide
(Examples 13, 14, 15)

4-ethyl-pyridine-2-amide
(Example 16)

Quinoline-2-amide
(Examples 6, 7, 9)

Quinoline-4-amide
(Examples 6, 7)

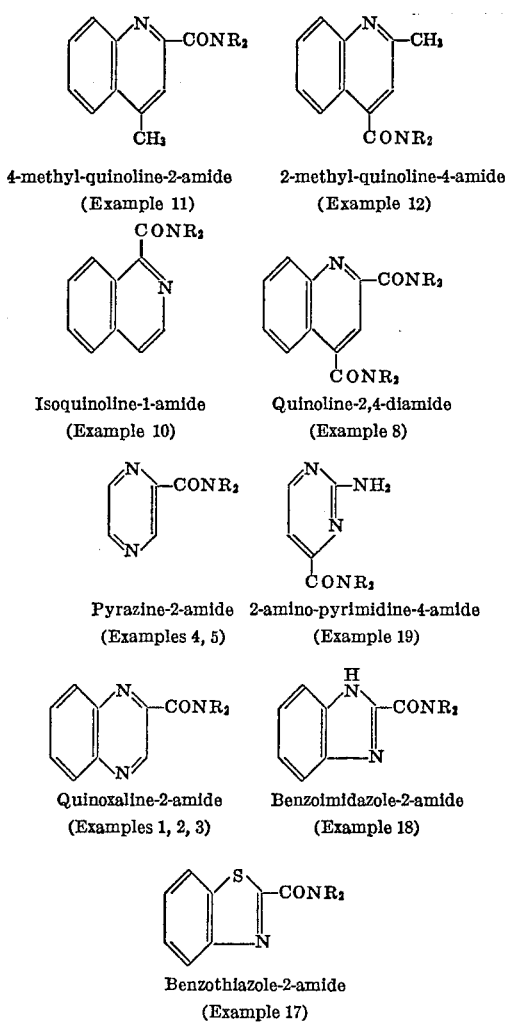

4-methyl-quinoline-2-amide (Example 11)

2-methyl-quinoline-4-amide (Example 12)

Isoquinoline-1-amide (Example 10)

Quinoline-2,4-diamide (Example 8)

Pyrazine-2-amide (Examples 4, 5)

2-amino-pyrimidine-4-amide (Example 19)

Quinoxaline-2-amide (Examples 1, 2, 3)

Benzoimidazole-2-amide (Example 18)

Benzothiazole-2-amide (Example 17)

The products that can be obtained according to this invention are interesting intermediates for the preparation of pharmaceutical compounds (i.e., against tuberculosis, arthrosis, etc.), of organic compounds useful for the analytical determination of Cu, Zn, Cl; of dyestuffs; and of insecticides. Moreover, some of them have herbicidal action.

The following examples are given for illustrating further the process according to the present invention.

EXAMPLE 1

To a solution of 13 g. of quinoxaline and 5.5 cc. of concentrated sulphuric acid in 100 cc. of formamide there were gradually and separately added over 15 minutes and under stirring and cooling, 15 cc. of hydrogen peroxide at 34% and 25 g. of finely powdered heptahydrated ferrous sulphate. The temperature was kept between 10° and 15° C.

Thereupon the excess of formamide was distilled and the residue was extracted with chloroform. The solvent was evaporated and there were thus obtained 13.8 g. of amide of 2-quinoxaline-carboxylic acid having a melting point of 200° C., characterized through comparison with a standard. By reextracting the residue of the extraction with chloroform there were recovered 2 g. of quinoxaline.

The yield was 95%, based on the converted quinoxaline.

EXAMPLE 2

By operating according to Example 1 and using, instead of hydrogen peroxide, 27 grams of t-butyl-hydroperoxide (tBu-OOH) and 70 grams of heptahydrated ferrous sulphate, 14.2 grams of amide of the 2-quinoxaline-carboxylic acid were obtained.

EXAMPLE 3

To a mixture of 13 g. of quinoxaline, 5.5 cc. of concentrated sulphuric acid and 70 g. of finely powdered ferrous sulphate in 10 cc. of dimethylformamide, 27 grams of t-butyl-hydroperoxide were added over a period of 15 minutes with stirring and cooling. The temperature was kept between 15° and 20° C.

This mixture was then diluted with water and extracted with chloroform. The solvent was evaporated and there were thus obtained 14 grams of N,N-dimethyl-amide of the 2-quinoxalinecarboxylic acid, characterized and confirmed by an elementary analysis and by the spectroscopic characteristics (I.R, MS and the NMR).

EXAMPLE 4

Into a 250 cc. flask, fitted with a stirrer, a thermometer and a drip-funnel, were placed 50 cc. of formamide; to this were then added, with stirring and outside cooling, 3 cc. of concentrated sulphuric acid and then 4 g. of pyrazine.

Into this solution were then dripped 11 grams of tert.-butyl-hydroperoxide and simultaneously, in small portions, were added 28 g. of heptahydrated ferrous sulphate, at such a rate that the temperature of the mixture was maintained at 5° to 10° C. After the addition, stirring was kept on for about another 15 minutes.

The content of the flask was then filtered and the solid and the filtrate were extracted separately in Soxhlet extractors continuously overnight with chloroform.

From the evaporated chloroform solutions, 3 g. of pyrazine-amide were obtained having a melting point of 190°–191° C. (crystallized from ethanol).

EXAMPLE 5

(A) Into a solution of 4 g. of pyrazine and 3 cc. of concentrated sulphuric acid in 50 cc. of dimethylformamide, there were dropped 11 grams of t-butyl-hydroperoxide while there were simultaneously added 28 g. of finely powdered heptahydrated ferrous sulphate, in small portions over a period of time. The temperature was kept between 5 and 10° C. This solution was then diluted with water and the mixture was then extracted with chloroform. The solvent and the dimethylformamide were evaporated, and 2.3 g. of N,N-dimethyl-pyrazine-amide were thus obtained by distillation at 112° C./2 torr. This compound solidifies under cooling and melts at 71°–72° C.

(B) Operating as in (A), with the only difference being that there were used 22 grams of t-butyl-hydroperoxide and 50 g. of heptahydrated ferrous sulphate, there was obtained 4.3 g. of N,N-dimethyl-pyrazine-amide and 2 g. of a mixture of diamides that were not separated.

EXAMPLE 6

22 g. of t-butyl-hydroperoxide and 56 g. of heptahydrated ferrous sulphate were added while stirring and cooling to a solution of 8 g. of quinoline, 3.5 cc. of concentrated sulphuric acid and 10 cc. of water in 60 cc. of dimethylformamide. The temperature was maintained between —5° and +10° C. The mixture was then diluted with water and extraction was carried out with chloroform.

The chloroform and the dimethylformamide were evaporated and there were thus obtained 12.5 g. of a mixture of N,N-dimethyl-amides of the 2- and 4-quinoline-carboxylic and 2,4-quinoline-dicarboxylic acids. The mixture was not analyzed quantitatively but only qualitatively by means of thin-layer chromatography.

EXAMPLE 7

A solution of 8 g. of quinoline, 3.5 cc. of concentrated sulphuric acid and 4.5 g. of di-t-butyl-peroxide in 50 cc. of dimethylformamide was heated under reflux conditions. After 10 hours, there were added to the solution further 4.5 g. of di-t-butyl-peroxide and the refluxing was continued for another 11 hours. Thereupon the solution was diluted with water and extracted with chloroform. The solvent and the dimethylformamide were evaporated and there were thus obtained 9 g. of a product having the same composition as the product obtained according to Example 6.

EXAMPLE 8

To a mixture of 13 g. of quinoline, 5.5 cc. of concentrated sulphuric acid and 65 g. of heptahydrated ferrous sulphate finely powdered in 100 cc. of formamide, there were added while stirring and cooling 30 cc. of hydrogen peroxide at 34%. The temperature was maintained between 20° and 30 °C. The mixture was then diluted with water and the solid iron complex which separated was filtered.

By treatment with acetic acid and water, there were obtained 5.5 g. of diamide of the 2,4-quinoline-dicarboxylic acid having a melting point of 277° C. identified by comparison with a known sample.

EXAMPLE 9

To a solution of 8 g. of quinoline and 3.5 cc. of concentrated sulphuric acid in 50 cc. of formamide, were added, with stirring and cooling, 20 grams of t-butyl-hydroperoxide and 50 g. of heptahydrated ferrous sulphate. The temperature was kept between 0° and 15° C.

The solution was then diluted with water and extracted with chloroform. In this way there was obtained 3.7 g. of amide of the 2-quinoline-carboxylic acid, which showed a melting point of 133° C. and was identified by comparison with a known standard.

EXAMPLE 10

This example was carried out in the same way as described above in Example 9, but starting from 8 grams of isoquinoline. There were thus obtained 3.2 g. of the amide of the 1-isoquinoline-carboxylic acid having a melting point of 168°–169° C. and identified by comparison with a known sample.

EXAMPLE 11

To a solution of 8 g. of 4-methyl-quinoline and 3.5 cc. of concentrated sulphuric acid in 50 cc. of formamide, there were added, while stirring and cooling, 22 g. of t-butyl-hydroperoxide and 40 g. of heptahydrated ferrous sulphate. The temperature was kept between 15° and 25° C. The solution was then diluted with water and was extracted with chloroform. 2.5 g. of amide of 4-methyl-2-quinoline-carboxylic acid having a melting point of 141° C. were obtained.

EXAMPLE 12

To a solution of 14.3 g. of 2-methyl-quinoline, 5.5 cc. of concentrated sulphuric acid and 30 cc. of hydrogen peroxide at 34% in 100 cc. of formamide, there were added, while stirring and cooling, 40 g. of finely powdered heptahydrated ferrous sulphate, in small portions over a period of time.

The temperature was kept between 20° and 30° C.

The solution was then diluted with water and was extracted with chloroform. In this way, there were obtained 2.8 g. of the amide of 2-methyl-4-quinoline carboxylic acid, which showed a melting point of 238° C. similar to a known sample.

EXAMPLE 13

To a solution consisting of 5 g. of pyridine, 3.5 cc. of concentrated sulphuric acid and of 10 cc. of water in 60 cc. of dimethylformamide, there were added 16 g. of t-butyl-hydroperoxide and 56 g. of heptahydrated ferrous sulphate, while stirring and cooling. The temperature was kept between 0° and 5° C.

This mixture was then diluted with water, alkalized with sodium hydroxide and extracted with chloroform. The chloroform was evaporated; there were distilled 3.5 g. of N,N-dimethyl-amide of the 2-pyridine-carboxylic acid, boiling point: 114°–116° C./0.5 torr, and as a distillation residue there remained 0.6 g. of tetramethyl-diamide of the 2,4-pyridine-carboxylic acid.

EXAMPLE 14

To a solution consisting of 5 g. of pyridine and 3.5 g. of concentrated sulphuric acid in 50 cc. of formamide, there were added, with stirring, 16 g. of t-butyl-hydroperoxide and 50 g. of heptahydrated ferrous sulphate. The temperature was maintained at between 10° and 25° C. The mixture was then neutralized with concentrated ammonia and was then taken up with acetone, the insoluble mineral salts being then removed by filtration.

After distillation of the acetone and the formamide, there were obtained 2.6 g. of diamide of the 2,4-pyridine-dicarboxylic acid, having a melting point of 255–256° C. In the distilled formamide there was present 1 gram of amide of the 2-pyridine-carboxylic acid, which could be precipitated as hydrochloride by means of hydrochloric acid; upon decomposing the hydrochloride with ammonia it was obtained as the free base, having a melting point of 111°–112° C.

EXAMPLE 15

To a solution consisting of 3.5 g. of amide of the 4-pyridine-carboxylic acid and 1.7 cc. of concentrated sulphuric acid in 30 cc. of formamide, there were added, with constant stirring and with cooling, 10 g. of t-butyl-hydroperoxide and 20 g. of heptahydrated ferrous sulphate. The temperature rose in the course of the reaction from 10° to 15° C.

The mixture was then taken up with acetone, the insoluble solid was filtered and then further extracted with boiling acetone and the acetone extracts were then combined. After the acetone and the formamide were evaporated, there remained 2.3 g. of diamide of the 2,4-pyridine-dicarboxylic acid, having a melting point of 255°–256° C.

EXAMPLE 16

To a solution consisting of 6 g. of 4-ethyl-pyridine and 3 cc. of concentrated sulphuric acid in 50 cc. of formamide, there were added simultaneously, while stirring and cooling, 22 g. of t-butyl-hydroperoxide and 50 g. of heptahydrated ferrous sulphate. The temperature during the reaction was kept between 10° and 20° C.

The mixture was then diluted with water whereupon 2.9 g. of amide of 4-ethyl-2-pyridine-carboxylic acid, having a melting point of 90–91° C., were extracted with chloroform.

EXAMPLE 17

To a solution consisting of 13.5 g. of benzothiazole and 10 cc. of concentrated sulphuric acid in 100 cc. of formamide, there were added, with stirring, 30 cc. of hydrogen peroxide at 30% and 56 g. of heptahydrated ferrous sulphate. The temperature during the reaction ranged from 25° to 35° C. The mixture was then diluted with water and the precipitated iron complex was filtered out. By decomposition of the latter with aqueous acetic acid, there were obtained 5 g. of the amide of 2-benzothiazole-carboxylic acid, melt point of 278° C., which turned out to be identical to a known standard.

EXAMPLE 18

Operating as described above in the case of benzothiazole but using instead benzo-imidazole, there was obtained 3.5 g. of the amide of 2-benzo-imidazole-carboxylic acid, having a melting point >300° C., and characterized and confirmed by elementary analysis and by the spectroscopic characteristics (I.R., MS, NMR).

EXAMPLE 19

To a solution consisting of 9.5 g. of 2-amino-pyridine and 10 cc. of concentrated sulphuric acid in 100 cc. of formamide, there were added, with stirring, 30 cc. of hydrogen peroxide at 34% and 58 g. of finely powdered heptahydrated ferrous sulphate. The temperature during the reaction was kept at 20°–30° C.

The mixture was diluted with water, alkalized with sodium hydroxide and extracted with chloroform. Thereby were thus obtained 2 grams of the amide of 2-amino-4-pyridine-carboxylic acid, having a melting point of 320° this amide was identified through elementary analysis and by the spectroscopic characteristics (I.R., MS, NMR).

What is claimed is:

1. A process for the preparation of amides of nitrogen heterocyclic bases comprising
    reacting a nitrogen aromatic base selected from the group consisting of quinoline, pyrazine, quinoxaline, pyridine, benzothiazole and benzoimidazole in strong mineral acid salified form with
    a formamide of the formula $HCONR_2$ wherein R is selected from the group consisting of hydrogen and an alkyl group having 1 to 5 carbon atoms or with
    a compound supplying the radical R'O• selected from the group consisting of hydrogen peroxide, t-butyl hydroperoxide and di-t-butyl peroxide
    at a temperature between −10° and +60° C.

2. The process of claim 1 wherein said compound supplying the radical R'O• is present in a redox system consisting essentially of said compound and $Fe^{++}$, wherein the molar ratio between the ferrous salt supplying $Fe^{++}$ and said compound is between 0.5 and 1 and
    the molar ratio between said compound and said nitrogen heterocyclic base is between 1 and 10 at temperatures between −10 and +60° C.

3. The process of claim 2 wherein the temperatures are between −5° and +35° C.

4. The process of claim 1 wherein said compound is di-t-butyl peroxide which is decomposed by thermal action wherein the molar ratio between said peroxide and said nitrogen aromatic heterocyclic base is between 1 and 10.

5. The process of claim 1 using the same formamide as a solvent as well as a reactant alone or in admixture with water.

References Cited

UNITED STATES PATENTS 3,527,759    9/1970    Shepard _____ 260—250 R

NICHOLAS S. RIZZO, Primary Examiner

U.S. Cl. X.R.

260—287 R, 304, 309.2, 295 K, 295.5 A